US008626965B2

(12) United States Patent
Feehrer et al.

(10) Patent No.: US 8,626,965 B2
(45) Date of Patent: Jan. 7, 2014

(54) USING A DMA ENGINE TO AUTOMATICALLY VALIDATE DMA DATA PATHS

(75) Inventors: John R. Feehrer, Westford, MA (US); Jane W. Yan, Andover, MA (US); Matthew G. Noel, Boulder Creek, CA (US)

(73) Assignee: Oracle International Corporation, Redwood Shores, CA (US)

( * ) Notice: Subject to any disclaimer, the term of this patent is extended or adjusted under 35 U.S.C. 154(b) by 247 days.

(21) Appl. No.: 13/189,801

(22) Filed: Jul. 25, 2011

(65) Prior Publication Data

US 2013/0031281 A1  Jan. 31, 2013

(51) Int. Cl.
*G06F 13/00* (2006.01)
*G06F 3/00* (2006.01)

(52) U.S. Cl.
USPC ............. 710/23; 710/2; 710/5; 710/8; 710/15

(58) Field of Classification Search
None
See application file for complete search history.

(56) References Cited

U.S. PATENT DOCUMENTS

2003/0093633 A1* 5/2003 Thiesfeld et al. ............. 711/154
2008/0140977 A1* 6/2008 Shimakura et al. ........... 711/169

* cited by examiner

*Primary Examiner* — Scott Sun
(74) *Attorney, Agent, or Firm* — Park, Vaughan, Fleming & Dowler LLP; Mark Spiller

(57) ABSTRACT

The disclosed embodiments provide a system that uses a DMA engine to automatically validate DMA data paths for a computing device. During operation, the system configures the DMA engine to perform a programmable DMA operation that generates a sequence of memory accesses which validate the memory subsystem and DMA paths of the computing device. For instance, the operation may include a sequence of reads and/or writes that generate sufficient data traffic to exercise the computing device's I/O controller interface and DMA data paths to memory to a specified level. The system initiates this programmable DMA operation, and then checks outputs for the operation to confirm that the operation executed successfully.

20 Claims, 3 Drawing Sheets

USING A DMA ENGINE TO AUTOMATICALLY VALIDATE DMA DATA PATHS

BACKGROUND

1. Field of the Invention

This disclosure generally relates to techniques for testing I/O subsystems in a computing device. More specifically, this disclosure relates to techniques for using a DMA engine to automatically validate DMA data paths and expose any latent bugs or throughput bottlenecks in an I/O subsystem.

2. Related Art

Recent advances in computational technology have led to improved processor capabilities, increased memory sizes, and increasingly sophisticated storage devices and peripherals. However, as the complexity of computer systems grows, comprehensively testing each component becomes difficult, and testing the interactions among multiple components even more so.

For instance, consider the process of developing and validating a high-performance I/O subsystem. A common challenge in validating an I/O subsystem in a lab is to create sufficient traffic to expose latent bugs or throughput bottlenecks, so that bug fixes or design modifications can be incorporated into the next version of a processor and/or chipset. Unfortunately, creating such traffic intensity can be difficult, because the needed leading-edge I/O devices and device drivers may also still be undergoing testing and may not yet be available. Earlier-generation devices can be used for testing purposes, but they may not generate enough traffic to adequately test a next-generation I/O subsystem. On the other hand, waiting until next-generation devices are available and fully supported potentially delays the discovery of some types of problems.

Hence, what is needed are techniques for validating an I/O subsystem without the above-described problems.

SUMMARY

The disclosed embodiments provide a system that uses a DMA engine to automatically validate DMA data paths for a computing device. During operation, the system configures the DMA engine to perform a programmable DMA operation that generates a sequence of memory accesses which validate the memory subsystem and DMA paths of the computing device. For instance, the operation may include a sequence of reads and/or writes that generate sufficient data traffic to exercise the computing device's I/O controller interface and DMA data paths to memory to a specified level. The system initiates this programmable DMA operation, and then checks outputs for the operation to confirm that the operation executed successfully.

In some embodiments, generating sufficient data traffic to exercise the computing device's I/O host interface and DMA data paths involves generating data access patterns that exercise the I/O bandwidth of the computing device to the desired level and confirm memory system coherency for the computing device.

In some embodiments, the system fully exercises the I/O bandwidth of the computing device to detect a mismatch between functional and performance (e.g., data throughput) capabilities of the computing device's I/O subsystem and the functional and performance capabilities of other (e.g., external) I/O devices which communicate with the computing device. Fully exercising the I/O bandwidth facilitates exposes latent bugs or throughput bottlenecks in the computing device's I/O subsystem.

In some embodiments, traffic generated by the DMA engine is multiplexed with I/O traffic from one or more external I/O devices.

In some embodiments, the programmable DMA operation is initiated for a processor in a chip testing environment, where driving and sampling the pins of the processor to exercise the I/O bandwidth of the processor at the desired level might otherwise not be possible.

In some embodiments, the system configures and initiates the programmable DMA operation by configuring a set of control and status registers for the DMA engine to specify an I/O test pattern and a duration. In some embodiments, this I/O test pattern includes: (1) a revolving pattern of read operations that load a known pattern of distinctive data values from the memory subsystem into a set of data registers in the DMA engine; and/or (2) a revolving pattern of write operations that generate a known pattern of distinctive data values in the DMA engine and transfer them to cachelines in the memory subsystem. Note that this revolving pattern may include unaligned reads and/or writes that trigger read-modify-write sub-operations, thereby stressing the memory and cache coherency subsystem.

In some embodiments, the computing device may not include a memory device. In such embodiments, the programmable DMA operation may involve sending a pseudo-random stream of data generated in a memory controller to the DMA engine. The DMA engine may then XOR this pseudo-random stream of data into one or more data registers, and then compare a resulting checksum with a known checksum value to confirm that the programmable DMA operation executed successfully.

DETAILED DESCRIPTION

Figure 1:
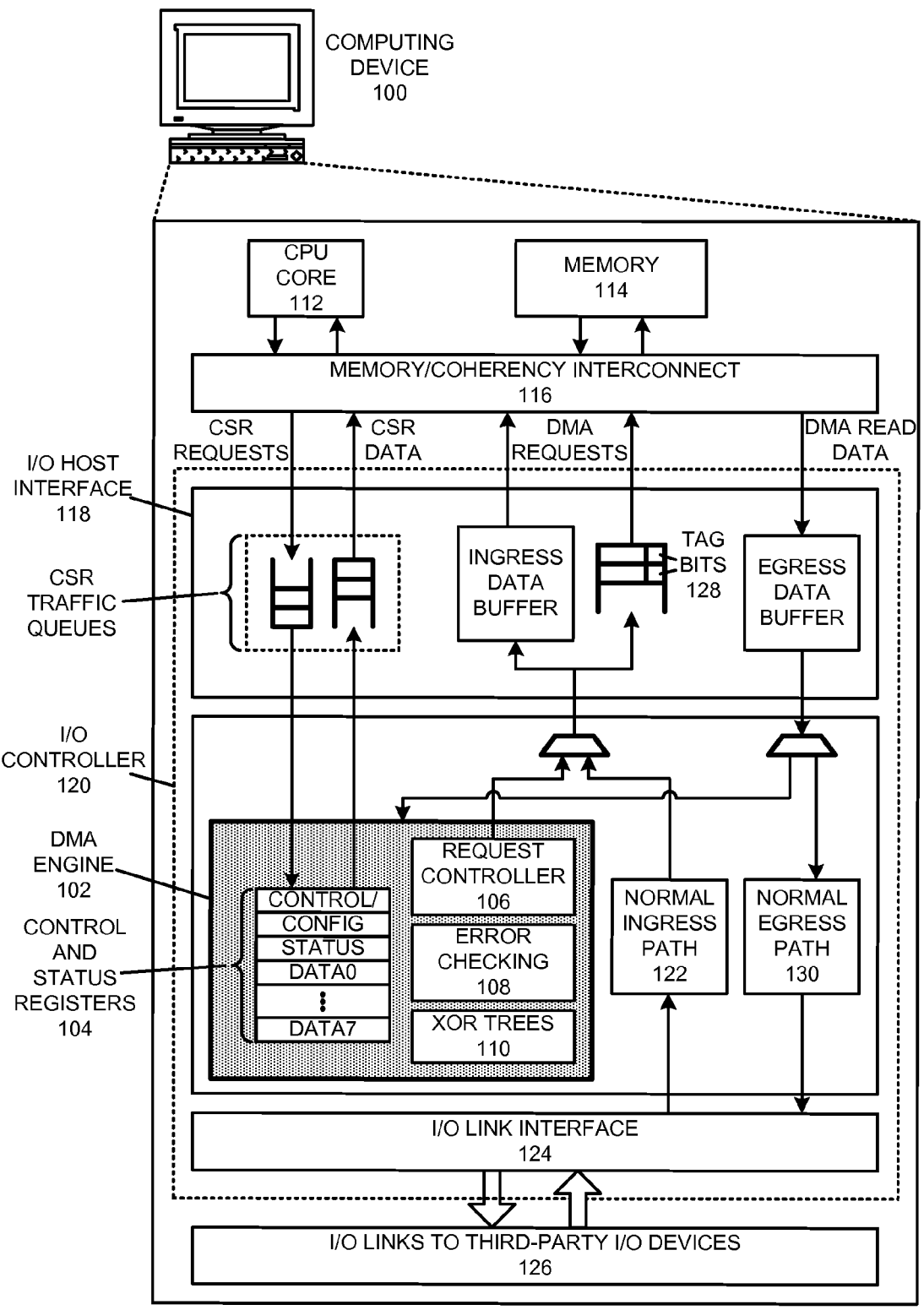
FIG. 1 illustrates an exemplary computing device in which a DMA engine can initiate a set of memory accesses that exercise an I/O subsystem and validate DMA data paths in accordance with an embodiment.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or non-transitory medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, a full-custom implementation as part of an integrated circuit (or another type of hardware implementation on an integrated circuit), field-programmable gate arrays (FPGAs), a dedicated or shared processor that executes a particular software module or a piece of code at a particular time, and/or other programmable-logic devices now known or later developed. When the hardware modules are activated, the hardware modules perform the methods and processes included within the hardware modules.

Challenges in Validating High-Performance I/O Paths

The performance of a computing device typically depends on a range of factors, including both the rate at which its processor can execute instructions as well as the speed with which target data can be accessed from I/O (input/output) devices and a memory subsystem. Many modern I/O subsystems support a "direct memory access" (DMA) capability, which enables hardware subsystems such as external I/O cards in a computer to read and write to system memory directly. In such systems, a processor may initiate a set of memory reads or writes to set up the external I/O device, but does not directly manage the memory accesses done by that device, and hence is not occupied for the entire operation. Allowing memory accesses to occur independently of the processing unit reduces overhead, and allows the processor to execute other instructions while the memory operation proceeds in parallel. When the memory accesses complete, an interrupt is typically sent to the processor, which can then proceed to operate upon loaded data or perform other operations, depending on the program context.

DMA allows a processor to perform useful work during I/O data transfers. However, the ability of a processor to perform useful work still depends on the availability of target data, and thus faster processor speeds typically motivate faster, and more complex, I/O subsystems. Unfortunately, increasing complexity and short development timeframes make sufficiently validating such I/O subsystems difficult. The validation process typically involves creating enough traffic intensity to expose any latent bugs or throughput bottlenecks, and needs to be completed quickly (and thoroughly) so that any resulting bug fixes or design modifications can be incorporated into the next "spin" (chip fabrication) of the processor and/or chipset.

A number of factors make validating a high-performance I/O subsystem difficult. For instance:

1. A high-performance I/O subsystem typically employs the latest technology standards and capabilities, in a timeframe when there is often a shortage (or absence) of I/O devices (e.g., plug-in cards) that are built to such standards. For example, an I/O subsystem may be designed to support a next-generation technology, but when the chipset is being developed and validated in the lab for the first time, most of the readily available I/O devices incorporate previous-generation technology that cannot exercise the data and control paths of the I/O subsystem and the memory hierarchy at the line rate (i.e., maximum data bandwidth) for which they were designed. For instance, such devices may only be able to generate or receive only half of the maximum data throughput supported by the new I/O subsystem.

2. Any available next-generation devices may not be sufficient (and/or sufficiently supported) for validation purposes. In order to use a third-party I/O device, a computing device's software stack needs to be functional enough to load any needed device drivers. A typical server environment often also includes multiple software components (e.g., power-on self-test diagnostics, hypervisor functionality that interfaces directly with hardware and hosts multiple guest operating systems, etc.) that may need to be debugged before an I/O device driver can execute. Such software complexity often means that hardware validation work may need to rely on a partially functioning software stack and/or a primitive device driver that cannot fully exercise I/O paths.

3. Sophisticated test equipment (e.g., a traffic generator that drives packets to and receives packets from the ports of an I/O subsystem) may be able to generate line-rate traffic intensity, but is typically expensive, and hence in short supply. For example, a validation lab may have only a single traffic generator that is shared among many different testbeds.

Because of such factors, hardware bugs that would be exposed at full traffic intensity might not be exposed until later in the validation cycle, if at all. Thus, mismatches between the capabilities of the I/O subsystem and available I/O devices can add risk to product schedules and overall product quality.

Embodiments of the present invention use a "DMA engine" that generates programmable sequences of reads and writes to exercise an I/O controller's host interface and DMA data paths to memory. This DMA engine can generate a set of memory accesses that exercise the full bandwidth of the I/O subsystem, and includes checking capabilities to validate data integrity and cache coherency.

Using a DMA Engine to Validate DMA Data Paths

FIG. 1 illustrates an exemplary computing device 100 in which a DMA engine 102 can initiate a set of memory accesses that exercise an I/O subsystem and validate DMA data paths. Note that some components are shown in overly simplified fashion for the sake of illustration. For instance, in FIG. 1, computing device 100 illustrates a single CPU core 112 and a single memory 114 linked by a memory/coherency interconnect 116. In some embodiments, computing device 100 might consist of multiple processor cores and multiple memories connected by a cache coherent interconnect that consists of multiple hierarchical levels.

DMA engine 102 is integrated into I/O controller 120, and includes a set of control and status registers (CSRs) 104, a request controller 106, an error checking module 108, and a set of XOR trees 110. The CSRs 104 are mapped to a non-cacheable memory space that can be read and written by CPU core 112. More specifically, CPU core 112 can program DMA engine 102 by performing programmed I/O transactions ("CSR requests" in FIG. 1) that are routed through memory/coherency interconnect 116 and I/O host interface 118 into CSRs 104. For instance, a processor thread running a testing program may load configuration values into CSRs 104 to configure a programmable test operation, invoke the operation, and then read resulting values ("CSR Data" in FIG. 1) stored in CSRs 104. In some embodiments, depending on the level and type of testing desired, the testing program may comprise low-level software that runs before an operating system boots. In alternative embodiments, this testing program may execute in an operating system environment.

Requests sent by request controller 106 are multiplexed with the normal ingress path 122 that routes data in from I/O links to third-party I/O devices 126 via the I/O link interface 124. A set of scoreboard entries in the I/O host interface include tag bits 128 that track the source of a request. DMA read data received from memory/coherency interconnect 116 via I/O host interface 118 is demultiplexed and directed either to DMA engine 102 or to the normal egress path 130 depending on whether DMA engine 102 or an I/O device, respectively, issued the corresponding DMA read request. Note that DMA engine 102 can be located at a level in the I/O pipeline where the specific I/O packet format associated with the underlying I/O link technology (e.g., PCI-Express) has already been converted to a more generic format, thereby allowing DMA engine 102 to be designed independently of the underlying I/O technology.

Note that in some embodiments DMA engine 102 and external I/O devices connected to I/O controller 120 may operate either in isolation (e.g., separately generating testing traffic) or may both operate simultaneously to increase the traffic through the DMA paths of computing device 100. For instance, DMA engine 102 can be configured to complement the traffic generated by early development versions of I/O cards, devices, and drivers (and/or previous-generation devices) to ensure that a desired traffic level (e.g., the estimated capacity of the I/O subsystem) is achieved. Because the DMA engine 102 is native to I/O controller 120, it can be configured to run at the maximum speed of the I/O subsystem; external I/O cards and devices often have constraints that prevent them from achieving similar bandwidths. Using DMA engine 102 in conjunction with other I/O devices also facilitates detecting unexpected design issues and interactions. Note also that traffic arriving from the two sets of sources may be multiplexed using a range of techniques. For example, a request multiplexer in I/O controller 120 may include a simple arbiter (e.g., a round-robin arbiter) that manages requests when the DMA engine and I/O devices connected to the I/O host controller are both generating traffic simultaneously.

In some embodiments, the DMA engine may be used in a range of testing environments. For example, while the above examples describe using the DMA engine in a completely assembled computing device with I/O cards and devices, in other embodiments the DMA engine may be used in a chip testing environment where a chip is tested in stand-alone fashion. Testing software in a chip testing environment is typically not capable of driving and sampling the pins of a chip's I/O ports in a way that mimics real I/O devices; hence, in this environment the DMA engine may be the only means of creating line-rate DMA traffic between the I/O and memory subsystems. The DMA engine can also facilitate pre-silicon RTL (Register Transfer Language) simulation testing. I/O device simulation models attached to the I/O host controller's I/O ports sometimes slow down the simulation, and often have throughput-limiting shortcomings; in contrast, a DMA engine included in the same simulation model can be used to more easily simulate a high volume of I/O traffic and a large number of I/O transactions in pre-silicon simulations.

Figure 2:
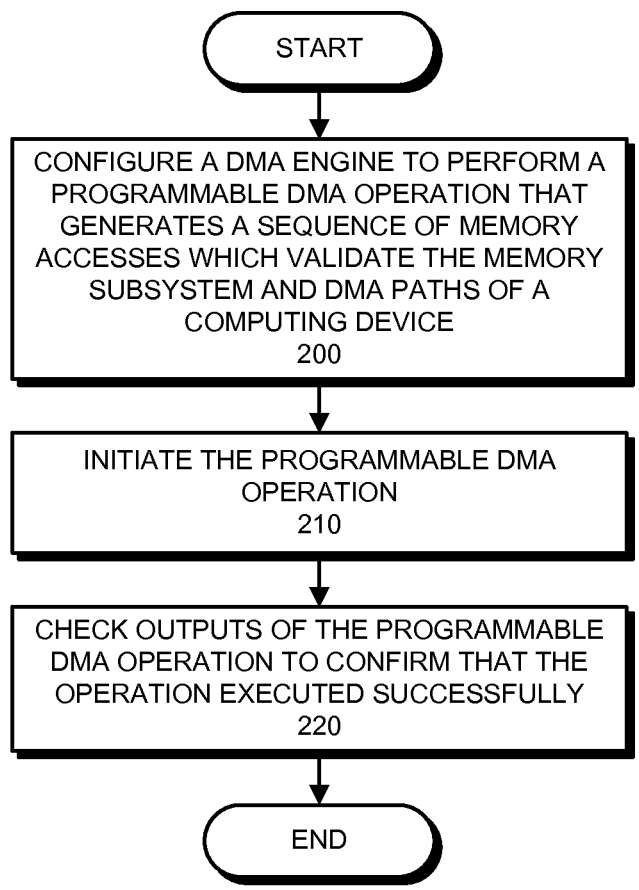
FIG. 2 presents a flow chart that illustrates the process of using a DMA engine to automatically validate DMA data paths for a computing device in accordance with an embodiment.

FIG. 2 presents a flow chart that illustrates the process of using a DMA engine to automatically validate DMA data paths for a computing device. During operation, the system configures the DMA engine to perform a programmable DMA operation that generates a sequence of memory accesses which validate the memory subsystem and DMA paths of the computing device (operation 200). For instance, the operation may include a sequence of reads and/or writes that generate sufficient data traffic to exercise the computing device's I/O controller interface and DMA data paths to memory to a specified level. The system initiates this programmable DMA operation (operation 210), and then checks outputs for the operation to confirm that the operation executed successfully (operation 220). In some embodiments, the DMA engine may also be configured to report the operation's pass/fail status to a program that has initiated the programmable DMA operation.

In some embodiments, the DMA engine may be implemented in a range of logical modules. For instance, in the exemplary computing device of FIG. 1, DMA engine 102 is incorporated into I/O controller 120, which is an advantageous location for initiating operations that exercise the I/O and memory subsystems. For instance, one benefit of co-locating DMA engine 102 in the I/O subsystem is that this location facilitates thoroughly testing as many portions of the I/O path as possible without needing external cards and/or devices. However, a DMA engine may be co-located in other logical areas of a chip design. For example, some processor implementations include "memory copy engines" that facilitate copying values in one memory location to another memory location. Some or all portions of a DMA engine that focuses on testing memory coherency and some aspects of the I/O subsystem might also be included in such a memory copy engine, or elsewhere.

Programmable I/O Test Patterns

A DMA engine may be configured to generate a range of target addresses and data accesses that stress the desired aspects of the I/O and memory hierarchy (e.g., the I/O data paths and cache coherency). In some embodiments, configuring a DMA engine may involve selecting a test pattern and a duration (and/or memory interval) over which the test pattern should execute. The following list describes a set of exemplary programmable test patterns that could be used to approximate the behavior and traffic intensity produced by a high-performance I/O device. Note that memory subsystems typically operate at a cacheline-size granularity. While the disclosed embodiments support any cacheline size, the following description illustrates a set of exemplary test patterns for a computing device with a 64-byte cacheline size and a memory/coherency interconnect that transfers 64-byte cachelines in four 16-byte chunks.

Exemplary programmable I/O test patterns may include one or more of the following (and/or combinations of one or more of the following):

1. Aligned Writes with Revolving Data Patterns: In some embodiments, the DMA engine performs a continuous stream of DMA cacheline writes to 64-byte incrementing addresses, with the writes containing a rotating 48-byte data pattern created from eight 8-byte data CSRs. For instance, a testing program may configure the CSRs with a count of cacheline requests that should be issued, a starting address, and a 64-byte data pattern. After this configuration, the testing program may then set a "go" command bit in a CSR to tell the DMA engine to begin the operation. In one exemplary test pattern, the first write pulls 48 bytes of data from 8-byte data registers 0, 1, 2, 3, 4, and 5, and fills in the remaining 16 bytes of the cacheline with a fixed pattern. The next write uses the 48 bytes of data from registers 6, 7, 0, 1, 2, and 3, and fills in the remainder of the cacheline with the same fixed pattern. The third write starts with registers 4, 5, etc., and the rotation continues in this fashion. This revolving pattern creates different data patterns in consecutive cachelines, which can be useful for catching memory addressing and/or cache coherency bugs. When the request counter reaches the programmed request count, the DMA engine sets a "done" bit in a CSR.

2. Aligned Reads with Revolving Data Patterns: Another test pattern is substantially similar to test pattern #1 above, but issues DMA reads instead of writes. For instance, a testing program may instead write an expected target data pattern to the data CSRs, write the same target data to a memory region that will be read by the DMA reads, and then initiate the read operations. For each DMA read, the DMA engine compares (e.g., using the error checking module 108 illustrated in FIG. 1) the received data with the appropriate registers corresponding to the read and the 16-byte fixed value. If there is a mismatch, the DMA engine increments an error counter in a CSR. The DMA engine also increments the error counter if there is an error signaled in the read completion header or an uncorrectable ECC (error control coding) error in the read data. When the request counter reaches the programmed request count and all of the requested read data has been received (e.g., the DMA engine and memory subsystem may allow a number of reads to be outstanding at any time), the DMA engine sets the "done" bit in the CSR.

3. Unaligned Writes with Revolving Data Patterns: In some embodiments, a test pattern may use substantially similar data patterns as in test pattern #1 above, but increment addresses in a manner such that writes are partial and/or unaligned. More specifically, DMA writes need not begin and/or end on cacheline boundaries. Crossing cacheline boundaries and/or writing only part of a cacheline incur additional complexity in the memory and cache coherency subsystem. For instance, the memory and/or I/O systems may need to load two cachelines, merge them, write in the changed values, split the merged lines into two separate lines again, and then write the two modified cachelines. Hence, the DMA engine may be configured to increment the target address by other than 64 bytes with each subsequent write to initiate such more-complex read-modify-write behavior and test a wider range of use cases. Ideally a DMA engine would generate requests that exercise every possible read-modify-write case, but because this may involve substantial additional hardware, a DMA engine implementation may instead select an address increment that generates an interesting variety of test cases with relatively minimal additional logic/hardware (e.g., incrementing the address by 48 bytes with each subsequent write).

4. Unaligned Reads with Revolving Data Patterns: Another test pattern issues DMA reads (substantially similar to test pattern #2 above), but uses an address increment interval that causes partial reads (e.g., by incrementing the target address by 48 bytes with each subsequent read, as in test pattern #3 above). Note that partial reads exercise slightly different logic than the read-modify-write functionality described above, and thus this test pattern exercises another portion of hardware in the memory subsystem.

5. Alternating Aligned Writes and Reads: Some test patterns may perform alternating writes and reads to 64-byte incrementing addresses, and perform checking on the read return data. For instance, a substantially similar data pattern (e.g., a rotating 48-byte value from registers and a fixed value, as described in test pattern #1 above) can be used, where: (1) the write is issued using the current data pattern; (2) a read is issued for the same address; (3) the read return data is checked to confirm that it matches the write data; and (4) the target address is then incremented by 64 bytes. In this pattern, a CSR storing the request counter may reflect the number of remaining pairs of writes and reads that need to be issued.

6. Aligned Read Data Generated by a Memory Controller and Stored as an XOR Checksum: Some test patterns may target a scenario where a hardware device is tested in a chip tester or in a system that does not currently have a memory device installed. Instead, a memory controller in the device may be modified to include a mode in which it can generate read data in response to a set of aligned read requests. For instance, the memory controller may generate data in the formats described above (e.g., in test pattern #2 above). Alternatively, in some embodiments, the memory controller may also be initialized with a seed value (e.g., by a testing program), and then generate a pseudo-random stream of data in response to read requests based on the seed value. In such embodiments, each set of received data might not be stored (and checked) in the data CSRs, but may instead be XOR'd (e.g., using the XOR trees 110 illustrated in FIG. 1) into one or more CSR registers. When the read sequence completes, the "done" bit is set in a CSR, and the final value in the target data CSR(s) is a deterministic (for the specific seed) "checksum" for the complete read operation. The testing program initiating the test pattern may compare an expected (e.g., pre-computed during simulation) value for the checksum with the checksum value stored in the target data CSR(s) to confirm that the read result is correct. Alternatively, the testing program may also transfer the expected value to another CSR, so that the DMA engine can perform the comparison. Note that the testing program needs to ensure that the target data CSR(s) are cleared prior to an XOR operation, to ensure that residual data stored in the target data CSR(s) does not lead to false errors. Note also that, as described above, the DMA engine also increments the error counter if there is an error signaled in the read completion header or an uncorrectable ECC error in the read data.

7. Unaligned Read Data Generated by a Memory Controller and Stored as an XOR Checksum: Another set of test patterns may use the same modified memory controller described in test pattern #6, but use an address increment interval that causes partial reads (e.g., by incrementing the target address by 48 bytes with each subsequent read).

8. Additional Ssage of XOR Checksum: Note that a number of the above test patterns may reduce the number of register comparisons by using the above-described XOR checksum technique. For instance, a variation of test pattern #5 above may replace the described read-data checking, instead generating an XOR checksum for the read data that is checked at the end of the test.

Note that while many of the above test patterns imply a fixed testing duration, in some embodiments the DMA engine may also be configured to support a "continuous mode" where, instead of using a transaction counter, the DMA engine performs continuous reads and/or writes until a testing program (or other mechanism) signals it to stop.

Note also that in the above-described test-patterns, the DMA engine does not generate an interrupt when a test pattern completes. Instead, the DMA engine sets a CSR bit which is polled by the testing program to determine whether a sequence of operations has completed. Not using an interrupt can simplify the hardware logic and software overhead associated with the DMA engine, and facilitates using the DMA engine in situations where interrupts may not be available and/or supported (e.g., in a tester environment, or in a scenario where low-level software that does not support interrupts is being used to test the DMA paths of a device). However, in some embodiments, the DMA engine may also be configured to generate interrupts when a testing operation completes. For instance, in some embodiments the DMA engine may be co-located in a portion of the I/O subsystem that generates interrupts, in which case configuring the DMA engine to also generate interrupts may involve very little additional effort and/or overhead.

In some embodiments, the number of outstanding transactions allowed by the DMA engine can be configured to range arbitrarily between the maximum number allowed by the I/O host interface logic (e.g., as limited by scoreboard resources in the I/O host interface) and a single request. A single-request scenario may be useful for certain debug scenarios or for focused memory subsystem testing. Note that the DMA engine can be configured to issue requests as closely spaced as possible, to mimic the traffic generated by a high-performance I/O device capable of achieving line rate for the given I/O link technology.

In some embodiments, memory may be interleaved across multiple chips in a multi-processor system, where large (e.g., multi-gigabyte) blocks of memory are owned by individual chips. In such embodiments, the DMA engine and/or the test patterns may include more elaborate control over address increments. For instance, the DMA engine may include an address stride mechanism that facilitates jumping to addresses managed by other nodes (e.g., other processor chips). Providing more elaborate control over address increments and allowing transactions that jump from chip to chip facilitate testing a more elaborate and sophisticated memory architecture and coherency interconnect.

In summary, embodiments of the present invention use a DMA engine that generates programmable sequences of reads and writes to exercise an I/O controller's host interface and DMA data paths to memory. This DMA engine can generate a set of memory accesses that exercise the full bandwidth of the I/O subsystem, and includes checking capabilities to validate data integrity and cache coherency. Such DMA engines are applicable to a broad range of computer architectures that include an I/O controller that performs DMA reads and writes to memory on behalf of I/O devices.

Computing Environment

Figure 3:
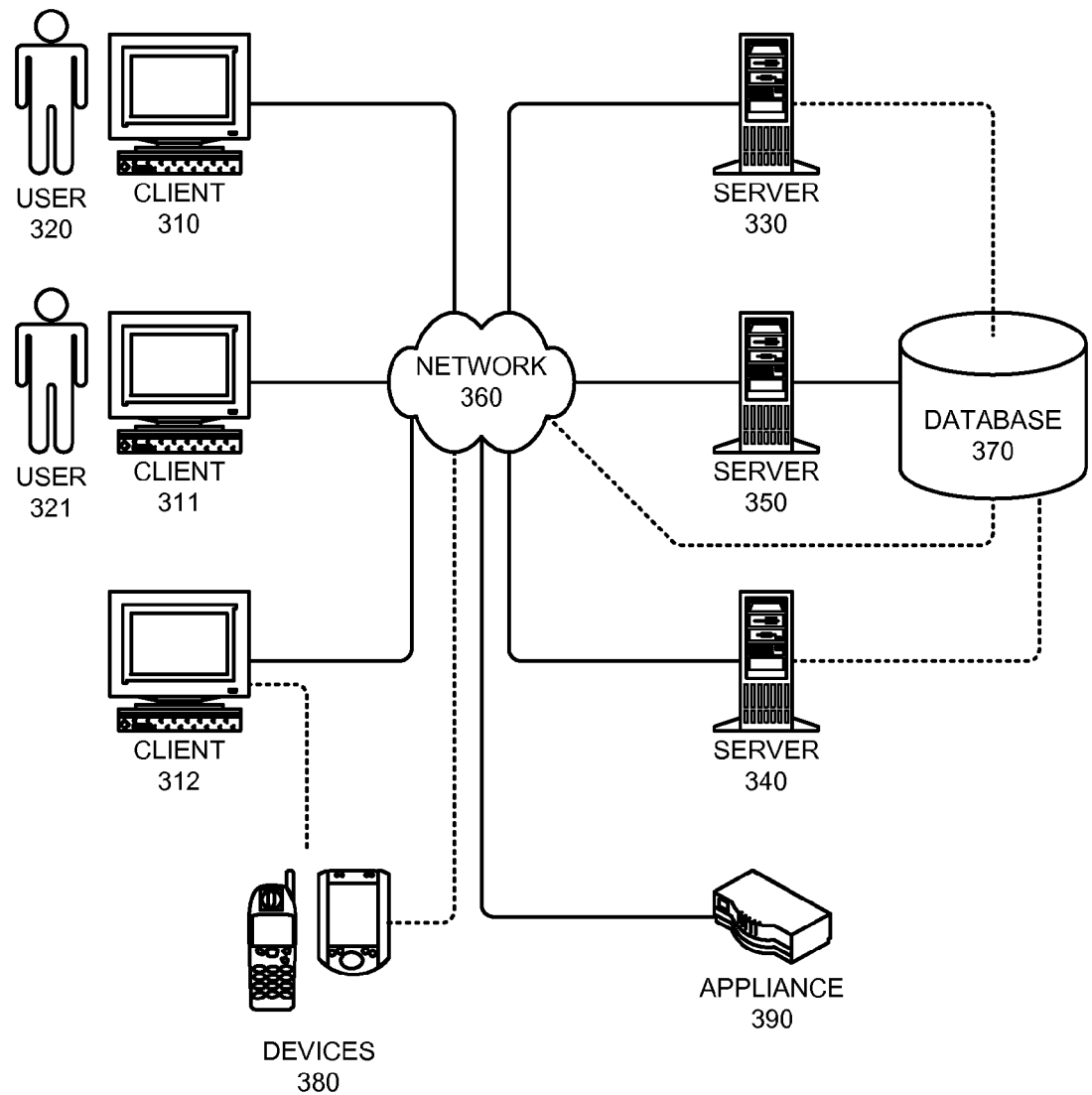
FIG. 3 illustrates a computing environment in accordance with an embodiment.

In some embodiments of the present invention, techniques for using a DMA engine to automatically validate DMA data paths can be incorporated into a wide range of computing devices in a computing environment. For example, FIG. 3 illustrates a computing environment 300 in accordance with an embodiment of the present invention. Computing environment 300 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 3, computing environment 300 includes clients 310-312, users 320 and 321, servers 330-350, network 360, database 370, devices 380, and appliance 390.

Clients 310-312 can include any node on a network that includes computational capability and includes a mechanism for communicating across the network. Additionally, clients 310-312 may comprise a tier in an n-tier application architecture, wherein clients 310-312 perform as servers (servicing requests from lower tiers or users), and wherein clients 310-312 perform as clients (forwarding the requests to a higher tier).

Similarly, servers 330-350 can generally include any node on a network including a mechanism for servicing requests from a client for computational and/or data storage resources. Servers 330-350 can participate in an advanced computing cluster, or can act as stand-alone servers. For instance, computing environment 300 can include a large number of compute nodes that are organized into a computing cluster and/or server farm. In one embodiment of the present invention, server 340 is an online "hot spare" of server 350.

Users 320 and 321 can include: an individual; a group of individuals; an organization; a group of organizations; a computing system; a group of computing systems; or any other entity that can interact with computing environment 300.

Network 360 can include any type of wired or wireless communication channel capable of coupling together computing nodes. This includes, but is not limited to, a local area network, a wide area network, or a combination of networks. In one embodiment of the present invention, network 360 includes the Internet. In some embodiments of the present invention, network 360 includes phone and cellular phone networks.

Database 370 can include any type of system for storing data in non-volatile storage. This includes, but is not limited to, systems based upon magnetic, optical, or magneto-optical storage devices, as well as storage devices based on flash memory and/or battery-backed up memory. Note that database 370 can be coupled: to a server (such as server 350), to a client, or directly to a network. In some embodiments of the present invention, database 370 is used to store information that may later be stored in unused bits of a memory pointer. Alternatively, other entities in computing environment 300 may also store such data (e.g., servers 330-350).

Devices 380 can include any type of electronic device that can be coupled to a client, such as client 312. This includes, but is not limited to, cell phones, personal digital assistants (PDAs), smartphones, personal music players (such as MP3 players), gaming systems, digital cameras, portable storage media, or any other device that can be coupled to the client. Note that, in some embodiments of the present invention, devices 380 can be coupled directly to network 360 and can function in the same manner as clients 310-312.

Appliance 390 can include any type of appliance that can be coupled to network 360. This includes, but is not limited to, routers, switches, load balancers, network accelerators, and specialty processors. Appliance 390 may act as a gateway, a proxy, or a translator between server 340 and network 360.

Note that different embodiments of the present invention may use different system configurations, and are not limited to the system configuration illustrated in computing environment 300. In general, any device that includes memory and I/O pathways may incorporate elements of the present invention.

Previously described FIG. 1 illustrates a DMA engine that can automatically validate DMA data paths and memory coherency. In some embodiments of the present invention, some or all aspects of DMA engine 102 can be implemented as dedicated hardware modules in computing device 100. For example, computing device 100 can include one or more specialized circuits for performing the operations of the mechanisms. Alternatively, some or all of the operations of DMA engine 102 may be performed using general-purpose circuits in computing device 100 that are configured using processor instructions.

Although FIG. 1 illustrates DMA engine 102 as being included in I/O controller 120, in alternative embodiments some or all of the described mechanisms can be either external or internal to I/O controller 120. For instance, these mechanisms may be incorporated into hardware modules that can include, but are not limited to, processor chips, application-specific integrated circuit (ASIC) chips, field-programmable gate arrays (FPGAs), memory chips, and other programmable-logic devices now known or later developed.

In these embodiments, when the external hardware modules are activated, the hardware modules perform the methods and processes included within the hardware modules. For example, in some embodiments of the present invention, the hardware module includes one or more dedicated circuits for performing the operations described below. As another example, in some embodiments of the present invention, the hardware module is a general-purpose computational circuit (e.g., a microprocessor or an ASIC), and when the hardware module is activated, the hardware module executes program code (e.g., BIOS, firmware, etc.) that configures the general-purpose circuits to perform the operations described above.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for using a DMA engine to automatically validate DMA data paths for a computing device, the method comprising:
configuring the DMA engine to perform a programmable DMA operation that generates a sequence of memory accesses which validate the memory subsystem and DMA paths of the computing device;
initiating the programmable DMA operation; and
checking an output for the programmable DMA operation to confirm that the programmable DMA operation executed successfully,
wherein configuring and initiating the programmable DMA operation comprises configuring a set of registers for the DMA engine to specify an I/O test pattern.

2. The computer-implemented method of claim 1, wherein the programmable DMA operation initiates a programmable sequence of accesses that generates sufficient data traffic to exercise the computing device's I/O interface and DMA data paths to memory to a desired level.

3. The computer-implemented method of claim 2, wherein generating the sufficient data traffic comprises generating data access patterns that exercise the I/O bandwidth of the computing device to the desired level and confirm memory system coherency for the computing device.

4. The computer-implemented method of claim 3, wherein exercising the I/O bandwidth of the computing device to the desired level facilitates:
detecting a mismatch between functional and performance capabilities of the computing device's I/O subsystem and the functional and performance capabilities of other I/O devices configured to communicate with the computing device; and
exposing latent bugs or throughput bottlenecks in the computing device's I/O subsystem.

5. The computer-implemented method of claim 4, wherein traffic generated by the DMA engine is multiplexed with I/O traffic from one or more external I/O devices.

6. The computer-implemented method of claim 2,
wherein the computing device is a processor; and
wherein the programmable DMA operation is initiated in a chip testing environment.

7. The computer-implemented method of claim 1, wherein the I/O test pattern comprises at least one of the following:
a revolving pattern of read operations that load a known pattern of distinctive data values from the memory subsystem into a set of data registers in the DMA engine; and
a revolving pattern of write operations that generate a known pattern of distinctive data values in the DMA engine and transfer them to cachelines in the memory subsystem.

8. The computer-implemented method of claim 7, wherein the revolving pattern includes unaligned accesses that trigger read-modify-write sub-operations, thereby stressing the memory and cache coherency subsystem.

9. The computer-implemented method of claim 7, wherein the computing device does not include a memory device, wherein initiating the programmable DMA operation comprises:
sending a pseudo-random stream of data generated in a memory controller to the DMA engine;
XORing the pseudo-random stream of data into one or more data registers in the DMA engine; and
comparing the resulting checksum in the one or more data registers with a known checksum value for the pseudo-random stream of data.

10. The computer-implemented method of claim 1, wherein configuring the set of registers comprises configuring a set of control and status registers for the DMA engine.

11. The computer-implemented method of claim 10, wherein configuring and initiating the programmable DMA operation further comprises configuring the set of control and status registers to specify a duration.

12. A computing device configured to use a DMA engine to automatically validate DMA data paths, comprising:
a processor;
a memory subsystem; and
a DMA engine configured to generate a programmable sequence of memory accesses for a programmable DMA operation;
wherein the DMA engine is further configured to receive an initiating signal that initiates the programmable DMA operation;
wherein, upon completing the programmable DMA operation, the DMA engine is further configured to check an output of the programmable DMA operation to confirm that the programmable DMA operation executed successfully;
wherein configuring and initiating the programmable DMA operation comprises configuring a set of registers for the DMA engine to specify an I/O test pattern; and
wherein successfully executing the programmable DMA operation automatically validates the memory subsystem and DMA paths of the computing device.

13. The computing device of claim 12, wherein the programmable DMA operation initiates a programmable sequence of accesses that generates sufficient data traffic to exercise the computing device's I/O interface and DMA data paths to memory to a desired level.

14. The computing device of claim 13, wherein generating the sufficient data traffic intensity comprises generating data access patterns that exercise the I/O bandwidth of the computing device to the desired level and confirm memory system coherency for the computing device.

15. The computing device of claim 14, wherein exercising the I/O bandwidth of the computing device to the desired level facilitates:
- detecting a mismatch between functional and performance capabilities of the computing device's I/O subsystem and the functional and performance capabilities of external I/O devices configured to communicate with the computing device; and
- exposing latent bugs or throughput bottlenecks in the computing device's I/O subsystem.

16. The computing device of claim 15, wherein traffic generated by the DMA engine is multiplexed with I/O traffic from one or more external I/O devices.

17. The computing device of claim 13,
- wherein the DMA engine is incorporated into the processor; and
- wherein the programmable DMA operation is initiated in a chip testing environment.

18. The computing device of claim 12, wherein the I/O test pattern comprises at least one of the following:
- a revolving pattern of read operations that load a known pattern of distinctive data values from the memory subsystem into a set of data registers in the DMA engine; and
- a revolving pattern of write operations that generate a known pattern of distinctive data values in the DMA engine and transfer them to cachelines in the memory subsystem.

19. The computing device of claim 18, wherein the revolving pattern includes unaligned accesses that trigger read-modify-write sub-operations, thereby stressing the memory and cache coherency subsystem.

20. A non-transitory computer-readable storage medium storing instructions that when executed by a computer cause the computer to perform a method for using a DMA engine to automatically validate DMA data paths for a computing device, the method comprising:
- configuring the DMA engine to perform a programmable DMA operation that generates a sequence of memory accesses which validate the memory subsystem and DMA paths of the computing device;
- initiating the programmable DMA operation; and
- checking an output for the programmable DMA operation to confirm that the programmable DMA operation executed successfully,
- wherein configuring and initiating the programmable DMA operation comprises configuring a set of registers for the DMA engine to specify an I/O test pattern.

* * * * *

UNITED STATES PATENT AND TRADEMARK OFFICE
CERTIFICATE OF CORRECTION

PATENT NO. : 8,626,965 B2 Page 1 of 1
APPLICATION NO. : 13/189801
DATED : January 7, 2014
INVENTOR(S) : Feehrer et al.

It is certified that error appears in the above-identified patent and that said Letters Patent is hereby corrected as shown below:

In the Specification

In column 8, line 55, delete "Ssage" and insert -- usage --, therefor.

Signed and Sealed this
Twelfth Day of August, 2014

Michelle K. Lee
*Deputy Director of the United States Patent and Trademark Office*